O. H. TEMTE.
COMBINED GARDEN WEEDER AND PULVERIZER.
APPLICATION FILED FEB. 15, 1916.
1,209,072.
Patented Dec. 19, 1916.
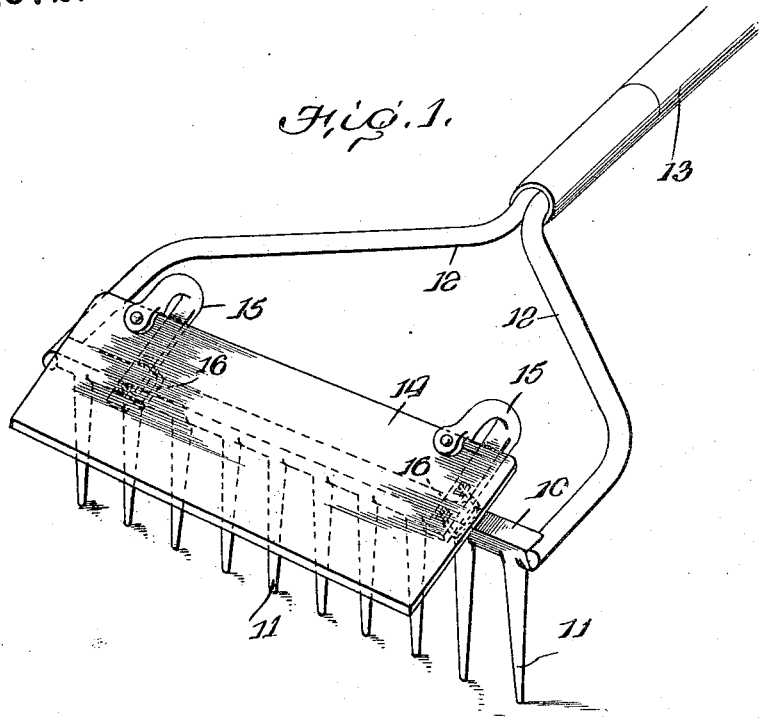
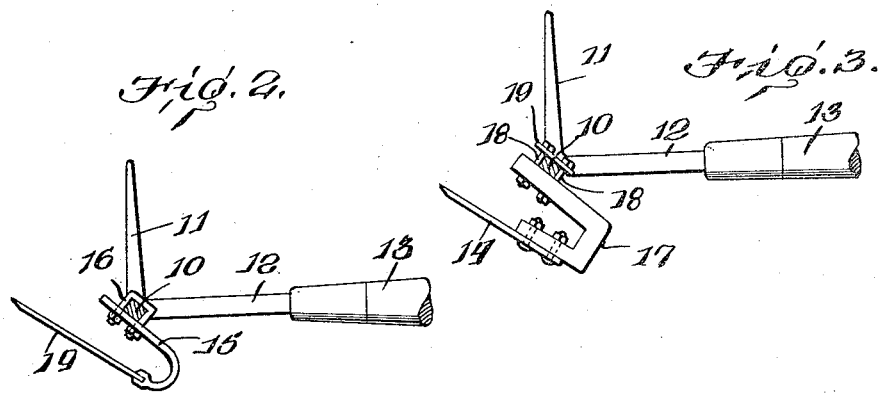
Inventor
O. H. Temte
By
Attorneys

UNITED STATES PATENT OFFICE.

OTTO H. TEMTE, OF VOLGA, SOUTH DAKOTA.

COMBINED GARDEN-WEEDER AND PULVERIZER.

1,209,072.  Specification of Letters Patent.  Patented Dec. 19, 1916.

Application filed February 15, 1916. Serial No. 78,469.

*To all whom it may concern:*

Be it known that I, OTTO H. TEMTE, a citizen of the United States, residing at Volga, in the county of Brookings and State of South Dakota, have invented certain new and useful Improvements in Combined Garden-Weeders and Pulverizers, of which the following is a specification.

This invention relates to a combined garden weeder and pulverizer and more particularly to the type of such devices illustrated and described in Patent No. 1,165,636, issued to me December 28th, 1915, for a similar invention.

The invention has as its primary object to provide in a single tool of this character, a rake and a hoe which may be independently used by properly manipulating the tool and wherein the hoe may, when desired, be easily attached to or detached from the rake.

The invention has as a further object to provide an improved and simple means for detachably connecting the hoe to the rake. And a still further object of the invention is to so mount the hoe relative to the rake that the said hoe will, in the practical use of the tool, act to direct weeds or other loose matter over the body bar of the rake, in the operation of raking, to prevent the rake from becoming clogged.

Other and incidental objects will appear as the description proceeds and in the drawings wherein I have illustrated the preferred embodiment of the invention and wherein similar reference characters designate corresponding parts throughout the several views, Figure 1 is a perspective view illustrating the mounting of the hoe relative to the rake to coöperate therewith, Fig. 2 is a fragmentary side elevation with the body bar of the rake shown in section and illustrating the manner in which the hoe is connected to the said body bar, and Fig. 3 is a similar view showing a slight modification in the mounting of the hoe.

In carrying out the invention, I employ a rake having a body bar 10 which is preferably angular in cross section and from the lower edge of which extend a plurality of transversely spaced teeth 11 projecting laterally and downwardly from the said body bar. Extending rearwardly from the extremities of the body bar 10 are coacting fork arms 12 which, at their inner extremities, converge toward each other to form a shank connected in any suitable manner to the adjacent terminal of a handle 13.

Detachably mounted upon the rake is a hoe including a flat hoe blade 14 which may be of any approved shape and to the inner margin of which is connected a pair of transversely spaced U-shaped arms or attaching members 15 having their free extremities disposed substantially parallel to the hoe blade. The free extremities of the arms 15 are apertured to removably receive U-bolts or other suitable type of fastening devices 16 embracing the body bar 10 of the rake and detachably connecting the hoe thereto. The U-bolts may be connected to the arms 15 by nuts or other suitable fastening means adjustable to tightly clamp the said arms against the body bar of the rake for rigidly supporting the hoe in position.

Attention is now directed to the fact that the hoe blade 14 is arranged above the body bar 10 of the rake to extend obliquely thereover in a downwardly direction toward the free ends of the rake teeth 11 and forwardly in advance of the said body bar as well as the rake teeth with the space between the said body bar and the hoe blade unobstructed. In operating the rake, therefore, the hoe blade 14 would tend to direct weeds or other waste matter over the body bar 10 so that the hoe will thus coact with the rake to prevent the clogging thereof. Furthermore, it will be observed that I provide an arrangement wherein the hoe may, if desired, be easily attached to or detached from the rake.

In Fig. 3 of the drawings, I have shown a slight modification wherein the arms supporting the hoe are made of cast metal and for this reason, the said arms should be relatively heavy to possess the required strength. The arms one of which is indicated at 17, are each of substantially U-shape and connected to the outer extremities thereof, is the hoe blade 14. The inner extremities of the said arms, which are disposed substantially parallel to the hoe blade, are arranged to seat against the body bar of the rake and are each detachably connected thereto by pairs of coacting bolts 18 with the bolts of each pair arranged upon opposite sides of the said body bar. Extending between each pair of bolts and freely fitted thereon, is a plate 19 which is clamped against the body bar by the nuts of the said bolts for securely connecting the arms 17 thereto to support the hoe in position, the hoe blade being mounted in the same relation to the rake as the hoe blade of the preferred form of the invention.

It will therefore be seen that I provide a very simple and efficient construction for the purpose set forth and a tool combining a hoe and a rake either of which may be used at will by properly manipulating the tool.

Having thus described my invention, what I claim and desire to secure by Letters Patent is:

1. A combination garden implement including a rake having a body bar provided with an inclined face and a hoe carried by the rake, said hoe including a hoe blade, an arm carried by the blade, and means connecting the said arm to the body bar of the rake with the said arm seating against the inclined face of the body bar to support the hoe blade extending forwardly and downwardly in the direction of the rake teeth.

2. A combination garden implement including a rake having a body bar, and a hoe carried by the rake, the said hoe including a hoe blade, an arm carried by the blade, and means connecting the said arm to the body bar of the rake and embracing the said body bar to coöperate therewith for holding the hoe against movement about the said bar with the arm supporting the hoe blade to extend forwardly and downwardly with respect to the rake teeth.

3. A combination garden implement including a rake having a body bar, and a hoe carried by the rake, the said hoe including a hoe blade, a U-shaped arm connected at one end to the hoe blade with the opposite end of the said arm extending forwardly beneath the said blade in spaced relation thereto, and means connecting the free end of the arm with the body bar of the rake with the said arm supporting the hoe blade spaced above the said body bar to extend forwardly with respect to the rake teeth.

4. A combination garden implement including a rake having a body bar provided with a squared portion having one of the faces thereof arranged at an angle to the plane of the rake teeth, and a hoe carried by the rake, the said hoe including a hoe blade, an arm carried thereby and seating flat against the said face of the body bar to support the hoe blade inclined forwardly and downwardly in the direction of the free ends of the rake teeth, and means connecting the said arm with the body bar and coöperating with the squared portion thereof for holding the hoe against movement about the said bar.

In testimony whereof I affix my signature.

OTTO H. TEMTE. [L. S.]

Copies of this patent may be obtained for five cents each, by addressing the "Commissioner of Patents, Washington, D. C."